No. 721,438. PATENTED FEB. 24, 1903.
C. GLOVER.
COASTER BRAKE.
APPLICATION FILED DEC. 4, 1902.
NO MODEL.

WITNESSES:
Geo. V. Rasmussen
S. H. Llyn

INVENTOR
Charles Glover.
BY
R. C. ......
ATTORNEY.

THE NORRIS PETERS CO., PHOTO-LITHO., WASHINGTON, D. C.

UNITED STATES PATENT OFFICE.

CHARLES GLOVER, OF NEW BRITAIN, CONNECTICUT.

COASTER-BRAKE.

SPECIFICATION forming part of Letters Patent No. 721,438, dated February 24, 1903.

Application filed December 4, 1902. Serial No. 133,806. (No model.)

*To all whom it may concern:*

Be it known that I, CHARLES GLOVER, a citizen of the United States, residing at New Britain, in the county of Hartford, State of Connecticut, have invented certain new and useful Improvements in Coaster-Brakes, of which the following is a full, clear, and exact description.

This invention relates to coaster-brakes and the like.

The object of the invention disclosed in this application is to provide a simple and reliable brake mechanism and means for applying the same in such manner as to avoid the danger of a too sudden application of resistance, such as might result in injury to the vehicle or rider.

Figure 1:
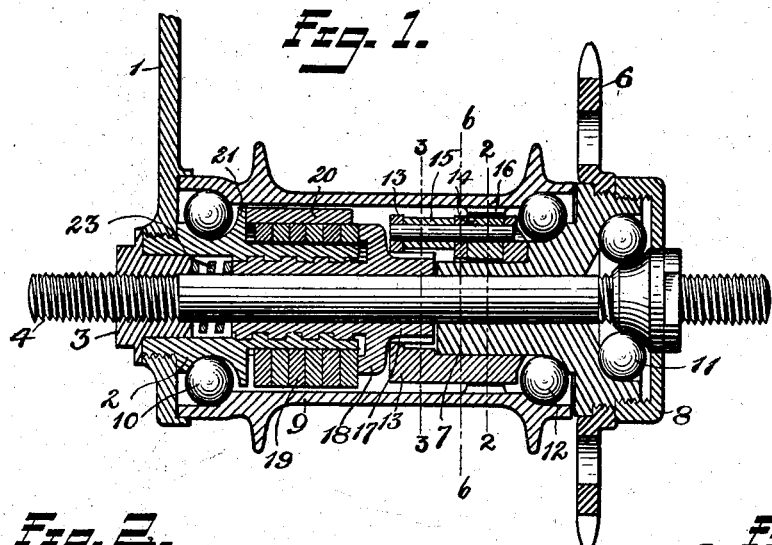
Figure 2:
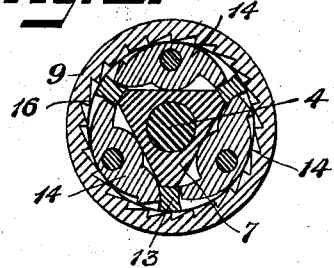
Figure 3:
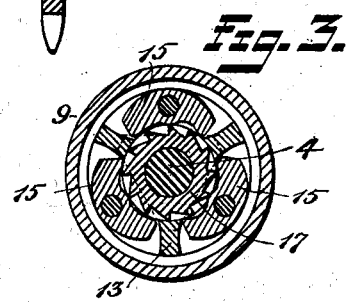
Figure 4:
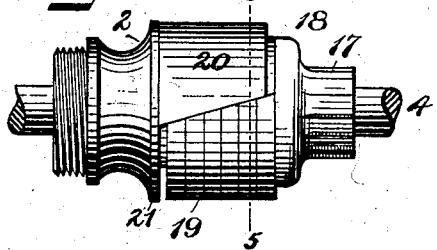
Figure 5:
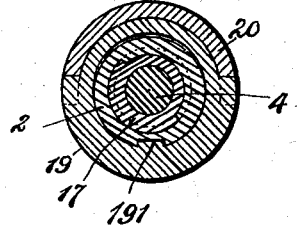
Figure 6:
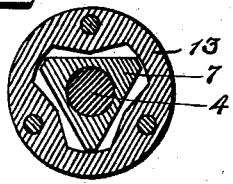

In the drawings, Figure 1 is a longitudinal cross-section of a construction embodied in my invention. Fig. 2 is a vertical cross-section on the plane of the line 2 2, Fig. 1. Fig. 3 is a vertical cross-section on the plane of the line 3 3, Fig. 1. Fig. 4 is an elevation of the brake mechanism proper with the surrounding hub and adjacent parts removed. Fig. 5 is a cross-section of the same on the plane of the line 5 5. Fig. 6 is a cross-section on the line 6 6, Fig. 1.

1 is an arm suitably connected with the sleeve 2, so as to hold the same stationary, the arm 1 being connected in the usual way to a convenient part of the vehicle-frame. (Not shown.) The sleeve 2 I shall term the "brake-carrying sleeve," and the same is concentric with the axle 4.

3 is a bushing which is secured at one end of the axle. 6 is a sprocket which constitutes the driving means and may be termed a "driver."

7 is a driver extension projecting into the wheel-hub 9 and loosely revoluble on the axle 4. This driver extension 7 is, as shown, annular in cross-section. The outer part of the driver may be covered by the dust-cap 8. Normally the hub 9 of the wheel rotates with the driver 6 when it is being driven forwardly, and both of said parts have their bearings on the balls 10 at the left and 11 at the right. When the driver is stopped, however, and the hub is permitted to revolve, the latter takes its bearings upon the balls 10 at the left and upon the balls 12 at the right. Between the hub 9 and the driver extension 7 is a frame 13, which carries two series of pawls 14 and 15. The driver extension 7 projects through the frame 13, and the passage through the latter is of such a size and shape that said parts (the frame and the driver extension) are permitted to have slight rotative movement independently of each other. The frame 13 carries two sets of pawls 14 and 15. The pawls 14 have outwardly-directed teeth 16, adapted to engage at the proper time with suitable teeth on the inside of the hub 9. The pawls 15 have inwardly-directed teeth adapted to engage at the proper time with the brake-actuator 17. The brake-actuator 17 is provided with the shouldered extension 18, which bears against a brake member 19, which coöperates with the second brake member 20. The brake member 19 is mounted upon the brake-carrying sleeve 2, and the passage through said member 19 is of such size that the said brake member may be moved outwardly far enough to engage with the inner surface of the hub 9. In one side of the brake member 19 is a suitable cavity, in which is located the second brake member 20. The brake member 20 is preferably in the form of a plate, the edges of which are inclined and bear against opposite inclinations formed on the brake member 19, so that when said members are moved longitudinally the brake-surfaces will be moved apart or spread, so as to afford the proper degree of resistance. A preferable way to form the brake member 19 is to build it up of a plurality of washer-like devices, which may be economically produced by stamping and placed side by side, as best seen in the drawings. The sleeve 2 is provided with a shoulder 21, which serves as an abutment for the brake member 20.

191 is a key on the brake member 19, said key projecting into the channel in said sleeve 2. This permits the member 19 to be moved longitudinally on sleeve 2, but prevents the rotation thereon. The brake-actuator 17 is provided with a screw-threaded extension which engages with a correspondingly-formed surface on the inner side of the sleeve 2. A helical spring 23 normally gives to the brake-actuator a movement to the right as viewed in Fig. 1.

When the driver is revolved forwardly, the driver extension first throws the teeth of the pawls 14 out into engagement with the teeth 16 on the hub 9, and then it bears against the frame 13, whereupon the driver is coupled to the hub through the medium of the driver extension, the frame, and the pawls 14. The continued advance of the driver causes the hub to revolve at the same rate of speed and in the same direction. At this time the pawls 15 are out of engagement with the brake-actuator 17, which stands in its normal inactive position.

When the driver 6 is checked, wheel-hub 9 will continue to revolve forwardly and the teeth of the pawls 14 will be disengaged from the teeth 16 of the hub, so as to leave the latter entirely free.

As soon as power is applied to the driver in a reverse direction the pawls 15 will be thrown into engagement with the teeth of the brake-actuator 17, so that the same can be rotated by the driver. The rotation of the brake-actuator will by the screw-threaded connection between said brake-actuator and the sleeve 2 cause the said brake-actuator to move to the left, and thus force the brake member 19 in the same direction against the inclined ends of the brake member 20, so that this movement will cause said brake members 19 and 20 to move apart and engage with the inner wall of the hub 20 and apply a braking action thereto. The degree of pressure depends upon the degree of power applied to the driver in a rearward direction. Since the spring 22 at all times tends to move the brake-actuator 18 to the right, it follows that as soon as pressure is released from the driver the brake members 19 and 20 move toward the axis and away from the hub, relieving the braking action. The parts of the brake construction proper are simple and may be formed of any suitable material. They may be readily replaced in case they are worn.

What I claim is—

1. In a coaster-brake for bicycles and other vehicles, a driver, a hub, a stationary sleeve, a brake-actuator coacting therewith, a brake member mounted on said sleeve, a second brake member coacting with said first-named brake member, means for operating said brake-actuator to throw said brake members into engagement with said hub.

2. In a coaster-brake for bicycles and other vehicles, a driver, a hub, a stationary sleeve, a brake-actuator coacting therewith, a brake member mounted on said sleeve, and means to prevent the rotation of the same thereon, a second member coacting with said first-mentioned brake member, means for operating said brake-actuator to move said brake member into engagement with said hub.

3. In a coaster-brake for bicycles and other vehicles, a driver, a hub, a stationary sleeve, a brake-actuator coacting therewith, a brake member loosely mounted upon said sleeve and means for preventing the rotation of said member thereon, a second brake member mounted on said first-named brake member, means for operating said brake-actuator to shift the first-mentioned brake member longitudinally with relation to the second-named brake member, and means intermediate of said brake members to cause them to move apart into engagement with said hub when said brake-actuator is operated.

4. In a coaster-brake for bicycles and other vehicles, a driver, a hub, a brake-actuator, a sleeve, a brake member loosely mounted thereon, means for preventing the rotation of said brake member on said sleeve, a second brake member mounted on said first-named brake member, the bearing-surfaces between said brake members being arranged on opposite inclinations, means for longitudinally and rotatably moving said brake-actuator to move one of said brake members longitudinally relatively to the other brake member.

5. In a coaster-brake for bicycles and other vehicles, brake mechanism comprising a stationary sleeve, a brake member loosely mounted thereon, means for preventing said brake member rotating thereon, a second brake member mounted on the first-named brake member, and means between said brake members to cause the braking-surfaces of said brake members to move outwardly when one of said brake members is shifted longitudinally and a brake-actuator for shifting one of said brake members longitudinally.

6. In a coaster-brake, brake mechanism comprising a stationary sleeve, a brake member loosely mounted thereon, means for preventing said brake member rotating thereon said brake member being composed of a series of washer-like pieces arranged side by side, a cavity in the side thereof, and a second brake member located in said cavity the bearing-surfaces of said brake members being arranged on opposite inclinations, and means for shifting one of said brake members longitudinally to move the same into engagement with the part to which resistance is to be applied.

Signed at New Britain, Connecticut, this 2d day of December, 1902.

CHARLES GLOVER.

Witnesses:
GEORGE E. CHRIST,
H. B. POST.